United States Patent
Anderson et al.

(10) Patent No.: US 10,263,827 B2
(45) Date of Patent: Apr. 16, 2019

(54) INFORMATION BRIDGE BETWEEN MANUFACTURER SERVER AND MONITORING DEVICE ON A CUSTOMER NETWORK

(75) Inventors: David Anderson, Victoria (CA); John C. Van Gorp, Sidney (CA)

(73) Assignee: SCHNEIDER ELECTRIC USA, INC., Andover, MA (US)

( * ) Notice: Subject to any disclaimer, the term of this patent is extended or adjusted under 35 U.S.C. 154(b) by 1513 days.

(21) Appl. No.: 12/651,090

(22) Filed: Dec. 31, 2009

(65) Prior Publication Data

US 2011/0161951 A1 Jun. 30, 2011

(51) Int. Cl.
*G06F 17/30* (2006.01)
*H04L 12/24* (2006.01)
*H04L 29/08* (2006.01)
*G06F 7/00* (2006.01)

(52) U.S. Cl.
CPC .... *H04L 41/0253* (2013.01); *G06F 17/30554* (2013.01); *H04L 41/12* (2013.01); *H04L 67/025* (2013.01); *H04L 67/12* (2013.01); *H04L 67/303* (2013.01); *H04L 67/34* (2013.01)

(58) Field of Classification Search
None
See application file for complete search history.

(56) References Cited

U.S. PATENT DOCUMENTS

| | | | |
|---|---|---|---|
| 5,933,841 A | 8/1999 | Schumacher et al. | 707/501 |
| 6,282,709 B1 | 8/2001 | Reha et al. | 717/11 |
| 6,286,138 B1 * | 9/2001 | Purcell | G06F 8/65 |
| | | | 709/203 |
| 6,353,926 B1 | 3/2002 | Parthesarathy et al. | 717/11 |
| 6,442,574 B1 | 8/2002 | Schumacher et al. | 707/501.1 |

(Continued)

FOREIGN PATENT DOCUMENTS

| | | | | |
|---|---|---|---|---|
| EP | 0 847 008 A2 | 6/1998 | | G06F 9/445 |
| EP | 1 717 699 A1 | 11/2006 | | G06F 9/445 |
| EP | 2 128 760 A1 | 12/2009 | | G06F 9/445 |

OTHER PUBLICATIONS

Belkin N Wireless Router, User Manual F5D8233-4, Jun. 26, 2007.*

(Continued)

*Primary Examiner* — Usmaan Saeed
*Assistant Examiner* — Yu Zhao
(74) *Attorney, Agent, or Firm* — Lando & Anastasi, LLP

(57) ABSTRACT

A monitoring device is in communication with a computer, including a memory, over a first network. The computer is further in communication with a server over a second network. A method for providing device information from the monitoring device to the server includes accessing a device web page stored on the monitoring device using a browser application operating on the computer. The monitoring device measures a utility characteristic and stores data indicative of the utility characteristic on a memory. The method further includes receiving a file from the monitoring device, including the device information. The device information includes at least device model information that identifies a model or type of the monitoring device. The method further includes storing the file in the memory of the computer, accessing a server web page stored on the server using the browser application operating on the computer, and transmitting the file to the server.

18 Claims, 5 Drawing Sheets

(56) References Cited

U.S. PATENT DOCUMENTS

| | | | |
|---|---|---|---|
| 7,237,104 B2 | 6/2007 | Philyaw | 713/1 |
| 7,444,358 B2 | 10/2008 | Paczkowski et al. | 707/104.1 |
| 7,574,693 B1 | 8/2009 | Kemink | 717/121 |
| 2003/0048470 A1* | 3/2003 | Garcia | G06F 3/1204 358/1.15 |
| 2004/0003266 A1 | 1/2004 | Moshir et al. | 713/191 |
| 2004/0034603 A1* | 2/2004 | Hastings et al. | 705/63 |
| 2006/0026304 A1* | 2/2006 | Price | 710/8 |
| 2006/0031476 A1 | 2/2006 | Mathes et al. | 709/224 |
| 2006/0048141 A1 | 3/2006 | Persson et al. | 717/176 |
| 2007/0255348 A1* | 11/2007 | Holtzclaw | 607/60 |
| 2009/0327483 A1* | 12/2009 | Thompson | G06F 17/30067 709/224 |

OTHER PUBLICATIONS

Zlatev, Multiple Network Connections at the Same Time on Windows, Jul 8, 2009.*

Eaton, Technical Data TD02601017E, Sep. 2009.*

Apple, updating iPod (downloaded from support.apple.com) (Jun. 25, 2010) (2 pages).

Apple, iTunes: Backing up, updating, and restoring your iPhone, IPad, or iPod touch software (downloaded from support.apple.com) (Jun. 25, 2010) (4pages).

"Digital Enhanced Cordless Telecommunications (DECT); New Generation DECT; Part 4: Light Data Services; Software Update Over the Air (SUOTA), Content Downloading and HTTP Based applications," ETSI Draft: NEWGEN0256-4V009, European Telecommunications Standards Institute (ETSI), 650, Route Des Lucioles; F-06921 Sophia-Antipolis; France, No. V0.0.9, Apr. 21, 2009 (Apr. 21, 2009), pp. 1-90.

PCT International Search Report for International Application No. PCT/US2010/059980 dated Mar. 10, 2011 (3 pages).

PCT International Written Opinion for International Application No. PCT/US2010/059980 dated Mar. 10, 2011 (8 pages).

"iPod touch User Guide For iPhone OS 3.1 Software" by Apple Inc., published on Sep. 9, 2009 (169 pages).

* cited by examiner

INFORMATION BRIDGE BETWEEN MANUFACTURER SERVER AND MONITORING DEVICE ON A CUSTOMER NETWORK

FIELD OF THE INVENTION

The present invention relates generally to utility monitoring systems and, in particular, to methods for communicating device-specific information from a monitoring device on a secured network to a manufacturer's server on an unsecured network.

BACKGROUND

Utility systems, such as an electrical utility system, are monitored by a network of monitoring devices (e.g., circuit breaker, relay, metering device, or power meter) coupled to a computer for monitoring various parameters or characteristics of the electrical utility system. The network of monitoring devices and the computer are typically referred to collectively as a power monitoring system.

The monitoring devices contain firmware and application software that are either provided by the manufacturers of the monitoring devices or by third party vendors. The manufacturers or third party vendors often release updated versions of existing firmware or software to support new features or fix bugs. However, users of the monitoring devices are often unaware of new versions of firmware or software that may be available. Additionally, manufacturers and third party vendors often issue product-related notifications (e.g., recall notices, safety notices, security notices, etc.). However, users of the monitoring device are also often unaware of these notifications.

One reason for users' lack of awareness regarding software updates and notifications is that the software updates and notifications are often available through the Internet only. Manufacturer or third party vendor websites typically contain information related to all products supported by the manufacturer or third party vendor, putting a burden on the user to locate the specific information that is relevant to the monitoring devices operated by the user.

Unlike many electronic devices, utility monitoring devices (e.g., power monitoring devices) are often intentionally isolated from the Internet for security purposes. Accordingly, such monitoring devices cannot communicate directly with a manufacturer or third party vendor website to automatically receive notifications and software updates relevant to those particular monitoring devices.

SUMMARY

According to one aspect, a monitoring device is in communication with a computer over a first network. The computer is further in communication with a server over a second network. The computer includes a memory. A method for providing device information from the monitoring device to the server includes accessing a device web page stored on the monitoring device using a browser application operating on the computer. The monitoring device measures a utility characteristic and stores data indicative of the utility characteristic on a memory of the monitoring device. The method further includes receiving a file from the monitoring device. The file includes the device information. The device information includes at least device model information that identifies a model or type of the monitoring device. The method still further includes storing the file in the memory of the computer, accessing a server web page stored on the server using the browser application operating on the computer, and transmitting the file to the server.

According to another aspect, a monitoring device is in communication with a computer over a first network. The computer is further in communication with a server over a second network. A method for providing device information from the monitoring device to the server includes accessing a device web page stored on the monitoring device using a browser application operating on the computer. The monitoring device measures a utility characteristic and stores data indicative of the utility characteristic on a memory of the monitoring device. The method further includes receiving a uniform resource locator (URL) from the monitoring device. The URL is associated with a server. The URL includes a query string corresponding to the device information. The device information includes at least device model information that identifies the model or type of the monitoring device. The method still further includes accessing the server using the URL.

According to still another aspect, a monitoring device is in communication with a computer over a first network. The computer is further in communication with a server over a second network. The computer includes a memory. A method for providing device information from the monitoring device to the server includes forming the device information into a cookie file. The device information includes at least device model information that identifies a model or type of the monitoring device. The monitoring device measures a characteristic of a utility and stores data indicative of the characteristic in the memory of the monitoring device. The method further includes transmitting the cookie file from the computer to the server.

The foregoing and additional aspects and embodiments of the present invention will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

Figure 1:
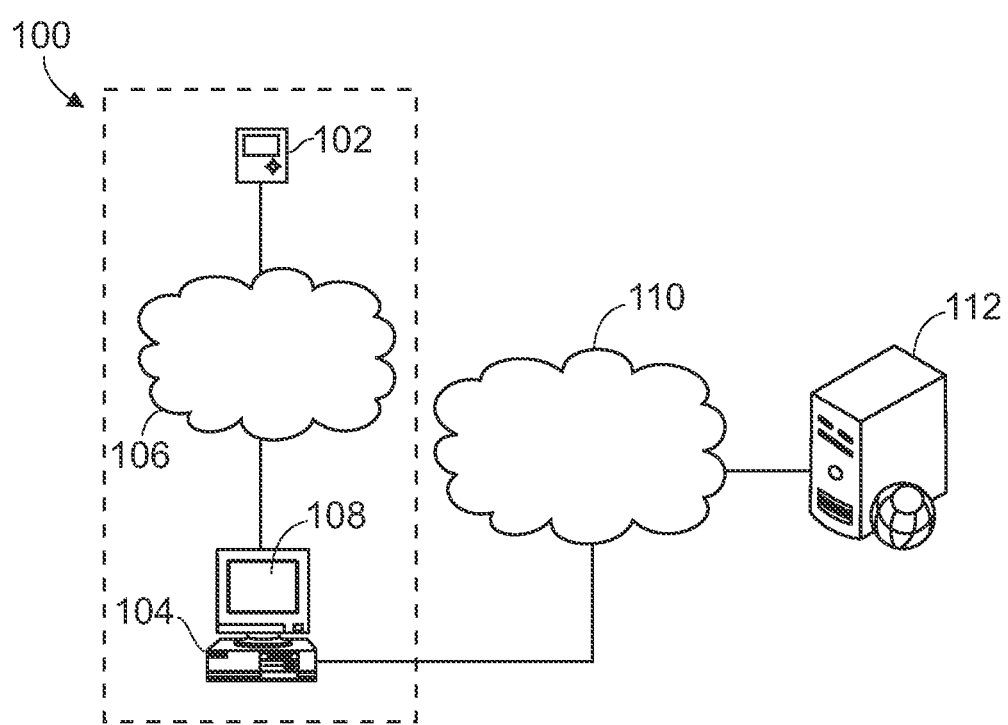
FIG. 1 illustrates a functional block diagram of a system for transmitting monitoring device information from a power monitor device to an external server.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention.

DESCRIPTION OF ILLUSTRATIVE EMBODIMENTS

Referring to FIG. 1, a block diagram of an exemplary utility monitoring system 100 is illustrated. The utility can be any one of WAGES, including water, air, gas, electricity, steam, and weather. In the illustrated and described aspects herein, the utility is electricity, and the monitoring system is a power monitoring system, but the aspects disclosed herein can be applied to any other monitored utilities.

The utility monitoring system 100 includes a monitoring device 102 and a client computer 104. For clarity of illustration and disclosure, the utility monitoring system 100 is described as including one exemplary monitoring device 102; however, it will be appreciated that a plurality of monitoring devices 102 can be included in the utility monitoring system 100. The monitoring devices can be of a variety of different models and types from more than one manufacturer. The monitoring device 102 measures or senses, for example, utility characteristics. In the electrical context, the utility characteristics are electrical characteristics (e.g., voltage, current, power, harmonics, combinations thereof, and/or the like) measured from a conductor carrying electrical current. As another example, in the water utility context, the utility characteristics can be a measured volume per unit of time of water flowing through a pipe. The monitoring device 102 generates monitored data within the monitoring device 102, which is indicative of the characteristics of the utility measured by the monitoring device 102. The monitored data is stored in a random access memory (RAM) and/or other dynamic storage device of the monitoring device 102. In the electrical context, the monitoring device 102 can be based on a PowerLogic® Series 3000/4000 Circuit Monitor or a PowerLogic® ION7550/7650 Power and Energy Meter available from Schneider Electric or any other suitable monitoring device such as a microprocessor-based circuit breaker, relay, metering device, or power meter. The monitoring device 102 conventionally includes an electronic controller, such as a microprocessor, for executing firmware or software stored in a memory device, which also stores data indicative of the characteristic of the utility measured or monitored by a sensor of the monitoring device 102, and a communications interface for communicating the data to an external system and for receiving instructions or other information from an external source.

The monitoring device 102 is coupled to the client computer 104 over a private network 106 such as, for example, a LAN network, a WAN network, a peer-to-peer network, a customer network, an intranet or the like. As used herein, a private network is any network that is communicatively isolated from the Internet. The monitoring device 102 can be a serial monitoring device that communicates with the client computer 104 according to a serial communications protocol (e.g., MODBUS®), an Ethernet-enabled monitoring device, combinations thereof, and/or the like. A gateway can be provided to couple a serial monitoring device to the private network 106. An example of a suitable gateway is the EGX400® Ethernet Gateway available from Schneider Electric USA, Inc. based in Palatine, Ill. An Ethernet-enabled monitoring device can be coupled directly to the private network 106 without needing an external gateway.

The client computer 104 can be any suitable data processing and networking device including, but not limited to, a hand-held device, a multiprocessor system, a microprocessor-based or programmable consumer electronic device, a network computer, a minicomputer, a mainframe computer, a net-book, combinations thereof and/or the like. In the illustrated embodiment, the client computer 104 is a personal computer. The client computer 104 includes a network interface or adaptor (e.g., a modem) for coupling the client computer 104 to the private network 106 to communicate with the monitoring device(s) 102.

The client computer 104 further includes a processor for processing information, a read only memory (ROM) and/or other static storage device for storing static information and instructions to be executed by the processor, and a random access memory (RAM) and/or other dynamic storage device for storing information, temporary variables, and instructions to be executed by the processor. The client computer 104 also includes a display device 108 for displaying information to a user.

The client computer 104 is operable to run a browser software application that can be integrated with an operating system software, or can be a separate application software. The browser can be a commercially available web browser (e.g., Microsoft Internet Explorer™) or a web client.

Using the browser, a user of the client computer 104 can access and display resources on the private network 106 such as, for example, servers, files, web pages, mail messages, and the like. In particular, the user can utilize the browser to access a device web page stored within a monitoring device 102 using a browser-readable format, such as hypertext markup language (HTML). Every monitoring device 102 on the private network 106 has a unique identifying number, called an Internet Protocol (IP) address, and/or a text-based address, called a hostname, associated with it. By entering the IP address or hostname of a monitoring device 102 into the browser according to a recognized format such as, for example, a uniform resource locator (URL) format, the device web page stored in the memory of the monitoring device 102 is displayed to the user of the client computer 104.

The device web page can be utilized for a variety of purposes. Generally, the device web page displayed by the browser allows the user to view and interact with text, images, video, audio, and other information included in the device web page. According to some aspects, the device web page can include real-time or historical data monitored by the monitoring device 102. For example, the web page displayed in the browser can include graphs, charts, numerical data, combinations thereof and/or the like that are based on the real-time or historical utility characteristics monitored by the monitoring device 102 for trend analysis, alarming, and reporting purposes, for example.

According to some aspects, the device web page can permit a user to configure various settings or configuration parameters of the monitoring device 102. Examples of configuration parameters include: device type (e.g., a CM3000 circuit monitor), identification information (e.g., TENANT1BUILDING4), a unit of measurement (e.g., Joules), a feature library (e.g., which device features should be enabled or disabled), pickup and dropout alarm thresholds, user preferences and user-defined quantities, types of data for the monitoring device 102 to log (e.g., energy-related data), setup information of the monitoring device 102, settings of the monitoring device 102, a threshold of an electrical characteristic (e.g., power, current, voltage, distortion, power factor, energy, demand, harmonics are examples of electrical characteristics) monitored by the monitoring device 102, a rated transformer voltage at the monitoring device 102, alarms, watchdogs, audit events, energy register rollover, pulse width of energy pulse outputs, firmware versions, program versions, communications settings (e.g., baud rate, parity, device address, communications protocol such as MODBUS®, JBUS, or TCP/IP, port number, delay parameters), clock synchronization method (e.g., synchronize to GPS, synchronize to line frequency, synchronize to internal clock), time synchronous source (e.g., COM port, optical port, Ethernet port), time zone offset, daylight savings time offset, standard or custom nameplate information (e.g., owner information, facility information, unique meter tag number, manufacturer serial number), maximum number of metrological (e.g., kWh, kVArh) records to be stored, number of restarts, number of control power failures, date and time information, phase correction factors, calibration information, current transformer (CT) and potential transformer (PT) ratios and other transformer information, the size of data logs, power demand calculation method (e.g., sliding window, thermal), power demand interval, nominal system frequency, diagnostics, operating mode parameters, peak demand, passwords, and the like. Examples of alarm thresholds include voltage thresholds (e.g., root-mean-square (RMS) values, harmonic components, total harmonic distortion), transient thresholds, and current thresholds (e.g., RMS values, harmonic components, total harmonic distortion). Some configuration parameters can be read only, others can be read/write. The parameter values correspond to a value (which can be numeric, alphanumeric, or any combination of characters) of a configuration parameter. For example, the configuration parameter "device type" can have a parameter value "CM3000." For example, the configuration parameter "nominal system frequency" can have a parameter value "60," which represents a frequency of 60 Hz. A "configuration parameter" can also include a firmware or software version. Corresponding parameter values of such firmware or software version include the version number, for example, and the name of the firmware or software.

The client computer 104 is also coupled to an external network 110 such as, for example, the Internet. The external network 110 provides a communication path between the client computer 104 and various external services, servers, websites, web pages, etc. Due to security concerns about external interference with a utility monitoring system, the monitoring devices 102 are not directly coupled to the external network 110. Additionally, because the client computer 104 is coupled to both the private network 106 and the external network 110, the client computer 104 includes suitable hardware (e.g., a switch) and/or software (e.g., a firewall) to isolate the monitoring device(s) 102 from the external network 110. In this example, the client computer 104 acts as an information bridge between the monitoring device 102 and the external network 110, permitting information to be shared between the monitoring device 102 behind the private network 106 and the external network 110, which can be publicly accessible.

In particular, the external network 110 provides a communication path between the client computer 104 and a remote server 112 that hosts a server website provided by a manufacturer of the monitoring device 102 or a third party vendor that provides services or information for the monitoring devices 102. The remote server 112 can be a server computer or a plurality of server computers. The server website can include, for example, server web page(s) supporting notifications, advertisements, downloadable software, products available for online purchase, combinations thereof and/or the like in connection with the monitoring devices 102. The server website can also include web page(s) supporting similar content in connection with devices and services not related to the monitoring device 102. For example, the server website can support content in connection with all products manufactured by the manufacturer of the monitoring devices 102.

A manufacturer or a third party vendor can advantageously deliver content that is relevant to a particular user of a client computer 104 accessing the server website if the manufacturer or third party vendor is provided with device information that is indicative of aspects of that user's specific monitoring device 102. The device information can include, but is not limited to, data indicative of a model or type of a monitoring device 102 (e.g., CM3000 circuit monitor), a unique identifier (e.g., a serial number) associated with a monitoring device 102, a version of a software or firmware installed on a monitoring device 102, combinations thereof, and/or the like. Device information indicative of a model or type of the monitoring device 102 is referred to herein as device model information.

As an example, the remote server 112 can include a database stored in a memory of the remote server 112 that associates any available notifications, advertisements, and/or software updates with specific models of monitoring devices 102 supported by the server website. A "software update" as used herein also refers to a firmware update. The device information provided by the client computer 104 to the remote server 112 includes data indicative of a model or type of a monitoring device 102. The remote server 112 cross-references the device information with the models stored in the database of the remote server 112 to determine whether any notifications, advertisements, and/or software updates are available for the particular model of monitoring device 102 indicated by the device information.

If the remote server 112 determines that a notification and/or advertisement is available, the server transmits a server web page from the memory of the remote server 112 to the client computer 104 that includes the available notification(s) and/or advertisement(s). The client computer 104 receives and displays the server web page including the notification(s) and/or advertisement(s) to the user via the browser. According to alternative aspects, the notification and/or advertisement can be displayed to the user via a pop-up window, a separate browser window, and/or the like.

Non-limiting examples of notifications that can be displayed to the user include notifications to inform the user about safety issues associated with a monitoring device 102, security issues associated with a monitoring device 102, tips or new instructions for operating a monitoring device 102, availability of a software or firmware update, instructions for downloading and installing a software or firmware update, a recall of a monitoring device 102, and the like. Non-limiting examples of advertisements include advertisements for the sale of new models of a type of monitoring device 102, the sale of accessories or peripherals for use with a monitoring device 102, the sale of software upgrades for a monitoring device 102, the sale of services for a monitoring device 102, and the like. It is contemplated that the device information can include an indication of the notifications and advertisements that the client computer 104 has already received so as to avoid repetitive notifications and advertisements if a user so desires.

If the remote server 112 determines that a software (or firmware) update is available, the client computer 104 displays a notification (e.g., via the server web page, a pop-up window, a separate browser window, or the like) to the user that a new software update is available as explained above. The notification can include instructions for obtaining the software update and/or installing the software update in the monitoring device 102.

Optionally, the client computer 104 queries the user to determine if the user wants to download the software update. The query can be displayed in a server web page, in a pop-up window, a separate browser window, and/or the like. If the user indicates that the user wants to download the software update (e.g., by clicking on an internet link, an icon, a button, or the like), the client computer 104 requests the software update from the remote server 112. In response, the remote server 112 transmits the software update from the memory of the remote server 112 to the client computer 104. The client computer 104 receives and stores the software update in the memory of the client computer 104.

The user can be automatically prompted to apply the software update to the monitoring device 102, or the user can manually initiate application of the software update to the monitoring device 102. In either case, the software update is subsequently transmitted by the client computer 104 to a monitoring device 102. The monitoring device 102 receives and stores the software update in the memory of the monitoring device 102.

To ensure that the software update has not already been applied to a monitoring device 102, the device information provided to the remote server 112 can also include the version of a software or firmware operating on a monitoring device 102. The remote server 112 can compare the device information with the available software or firmware update to determine whether the software or firmware operating on the monitoring device 102 is the most current version.

A manufacturer or a third party vendor can also utilize the device or installation information to advantageously collect information and data in connection with a monitoring device 102 from a user of a client computer 104 accessing the server website. For example, the device information can include statistics and information about the installation of a monitoring device 102, operating conditions of a monitoring device 102, historical data indicative of utility characteristics monitored by a monitoring device 102, combinations thereof, and/or the like. In addition, the device information can include installation information about the conditions, parameters, or settings of the installation of the monitoring device 102. Examples of installation information can be found in the exemplary list of configuration parameters set forth above, such as communications settings and protocol, sampling rates relating to how frequently the characteristics of the utility are measured, and the like.

This information can be used by a manufacturer or a third party vendor for research and development purposes, to identify safety issues, to identify security issues, to develop software or firmware updates, combinations thereof, and/or the like.

As explained above, the server website cannot obtain the device information directly from the monitoring devices 102 because the monitoring devices 102 are only accessible through the private network 106, which is isolated from the external network 110 and the server website by, for example, a firewall. Exemplary ways of obtaining device information from a monitoring device 102 coupled to a client computer 104 over a private network 106 and providing device information to a remote server 112 from a client computer 104 over an external network 110 are described next.

Figure 2:
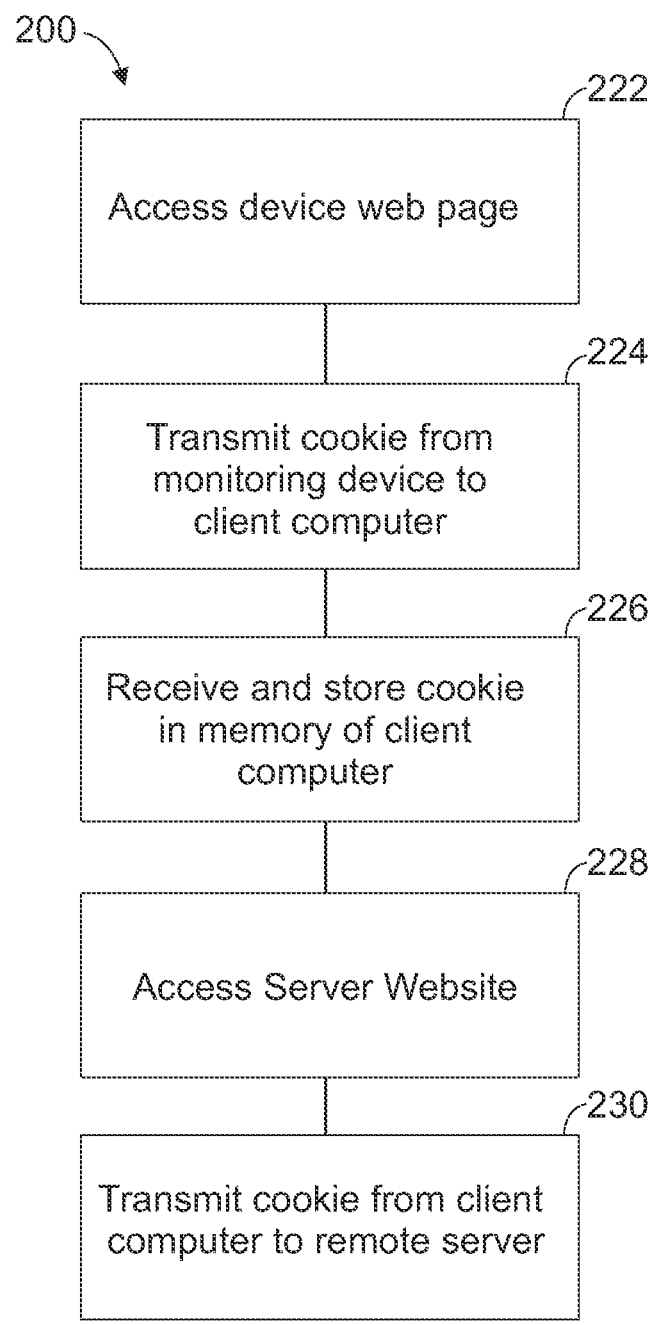
FIG. 2 illustrates a flow chart of a method for providing device information from a monitoring device to a server.

Referring to FIG. 2, a flow chart of an algorithm 200 for providing device information from the monitoring devices 102 to the remote server 112 according to an implementation is illustrated. The algorithm 200 generally includes the use of a file, which includes the device information, in conjunction with a web browser. In the illustrated and described aspects herein, the file is a HTTP cookie file, but it is contemplated that other suitable file types can be utilized such as, for example, a local shared object file, a Document Object Management (DOM) storage file, combinations thereof and/or the like.

At block 222, a user of the client computer 104 accesses the device web page stored in the memory of a monitoring device 102 by entering a URL including an IP address or hostname associated with the monitoring device 102 into the browser software application running on the client computer 104. At block 224, a cookie or cookie file is transmitted from the monitoring device 102 to the client computer 104. A "cookie" file as used herein is also referred to as an HTTP cookie, as that term is understood in the computer networking and web browser arts. The cookie file includes the device information associated with the monitoring device 102. It is important to emphasize that in this example the cookie file is generated by and resides originally in the monitoring device 102. It is not originally generated by the computer 104 or by the remote server 112. At block 226, the client computer 104 receives and stores the cookie file in the memory of the client computer 104. At block 228, the user of the client computer 104 accesses a server website stored on a remote server 112 by entering a server URL including an IP address or hostname associated with the remote server 112 into the browser running on the client computer 104. Optionally, the device web page stored on monitoring device 102 can include the server URL. At block 230, the client computer 104 transmits the cookie file including the device information to the remote server 112.

In another example, the monitoring device 102 transmits the contents of the cookie file to the client computer 104, which formulates the cookie file and stores it on the memory of the client computer 104. In other words, instead of the monitoring device 102 sending the actual cookie file itself to the client computer 104, the monitoring device 102 can send the data content to be stored in the cookie file (such as the device information of the monitoring device 102), and the client computer 104 generates the cookie file based on the data content received from the monitoring device 102.

Figure 3:
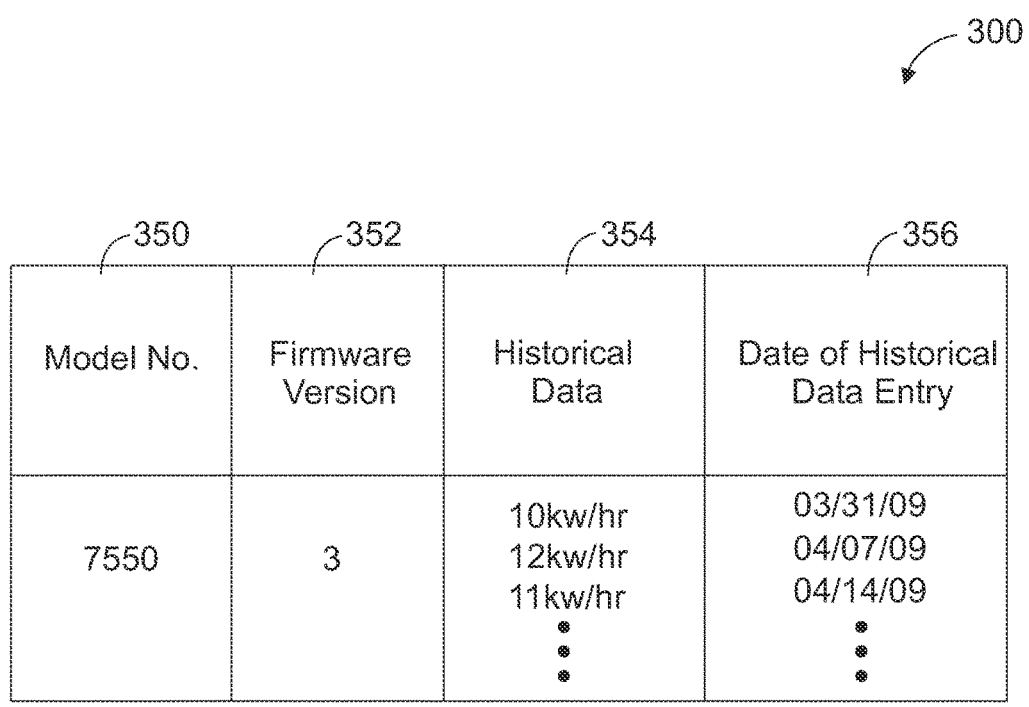
FIG. 3 illustrates an exemplary cookie for providing device information from a monitoring device to a server according to the embodiment of FIG. 2.

FIG. 3 illustrates an example of a cookie file that stores the device information. The cookie file includes one or more attributes or fields in either text or shorthand code. The format of the cookie file can follow widely adopted standards, such as RFC 2965 by the Internet Engineering Task Force (IETF). A first field 350 indicates the model (e.g., CM3000) or type of the monitoring device 102. A second field 352 indicates the version of the software/firmware operating on the monitoring device 102. A third field 354 indicates historical data measured by the monitoring device 102 and a fourth field 356 indicates the date corresponding to each entry of historical data. The monitoring device 102 can be configured to overwrite or update the cookie file as the information corresponding to the fields of the cookie file change. Although four fields are shown in this example, it should be understood that fewer, additional, or different fields can be included in the cookie file.

Figure 4:
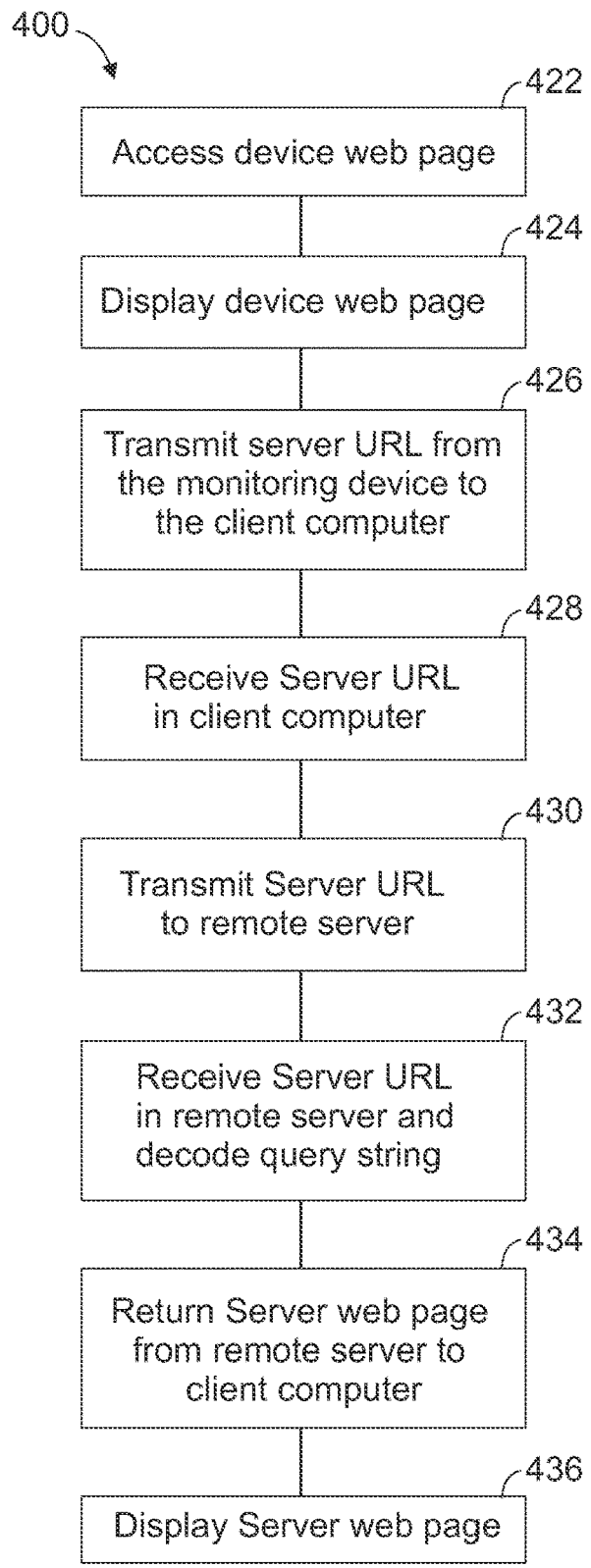
FIG. 4 illustrates a flow chart of a method for providing device information from a monitoring device to a server according to an alternative embodiment.

Referring to FIG. 4, a flow chart of a method 400 for providing device information from a monitoring device 102 to a remote server 112 according to an alternative embodiment is illustrated. The illustrated method 400 utilizes a technique known as framing to provide device information from a monitoring device 102 to a remote server 112.

Framing involves segmenting the graphical interface of a browser window into a plurality of regions, called frames.

Each frame displays a different web page, HTML document, or other network resource. The contents of any particular frame can be hosted on the same source as the parent page (e.g., a monitoring device 102), or the browser may link in code from another source (e.g., a remote server 112) to display content from the other source. One or more of the frames can be a configured as a menu including links to additional web pages, HTML documents, or other network resources that can be displayed in the other frames.

At block 422, a user of a client computer 104 accesses a device web page stored in the memory of a monitoring device 102 by entering an IP address or hostname associated with the monitoring device 102 into a browser operating on the client computer 104. At block 424, the device web page is displayed in one or more frames of the browser.

In addition to the device web page, a server URL associated with a server web site is stored in the memory of the monitoring device 102. The server URL includes at least a protocol identifier (e.g., http, ftp, etc.), an IP address or hostname associated with the server website, and a query string. The query string includes data that is passed to the remote server 112. Accordingly, the device information is encoded or incorporated into the query string to provide the device information to the remote server 112. As an example, a server URL of "http://www.company.com/meterquery.aspx?Meter=7550&version=3" can be used to provide device information indicating that the model of a meter corresponds to 7550 and the firmware version is 3 to a remote server 112 storing a server website associated with the hostname of www.company.com according to the HTTP protocol. The website www.company.com can refer to a website of a manufacturer of the meter corresponding to model 7550.

Alternately, the server URL can include a meter model or type and an options code. For example, the server URL of "http://www.company.com/meterquery.aspx?Meter=7550&options=A0B3B" informs the remote server 112 that the monitoring device 102 is a power meter model 7550 and is configured with options code A0B3B. The server 112 queries a database to determine relevant information about power meter model 7550 configured with options code A0B3B, which includes default configuration parameters about power meter model 7550. The options code is a bundle of configuration parameters about a particular monitoring device model, and a database of options codes and their corresponding monitoring device models or types is accessed by the remote server 112.

At block 426, the monitoring device 102 transmits the server URL from the memory of the monitoring device 102 to the client computer 104. At block 428, the client computer 104 receives the server URL from the monitoring device 102. At block 430, the client computer transmits the server URL to the remote server 112 via the web browser operating on the client computer 104. At block 432, the remote server 112 receives the server URL and decodes the device information and other information (such as the version number) provided in the query string. At block 434, the remote server 112 returns a server web page stored in the memory of the remote server 112 to the client computer 104. At block 436, the client computer 104 displays the server web page in one or more frames of the browser. The device web page(s) and the server web page(s) can be simultaneously displayed in the browser operating on the client computer 104.

Figure 5:
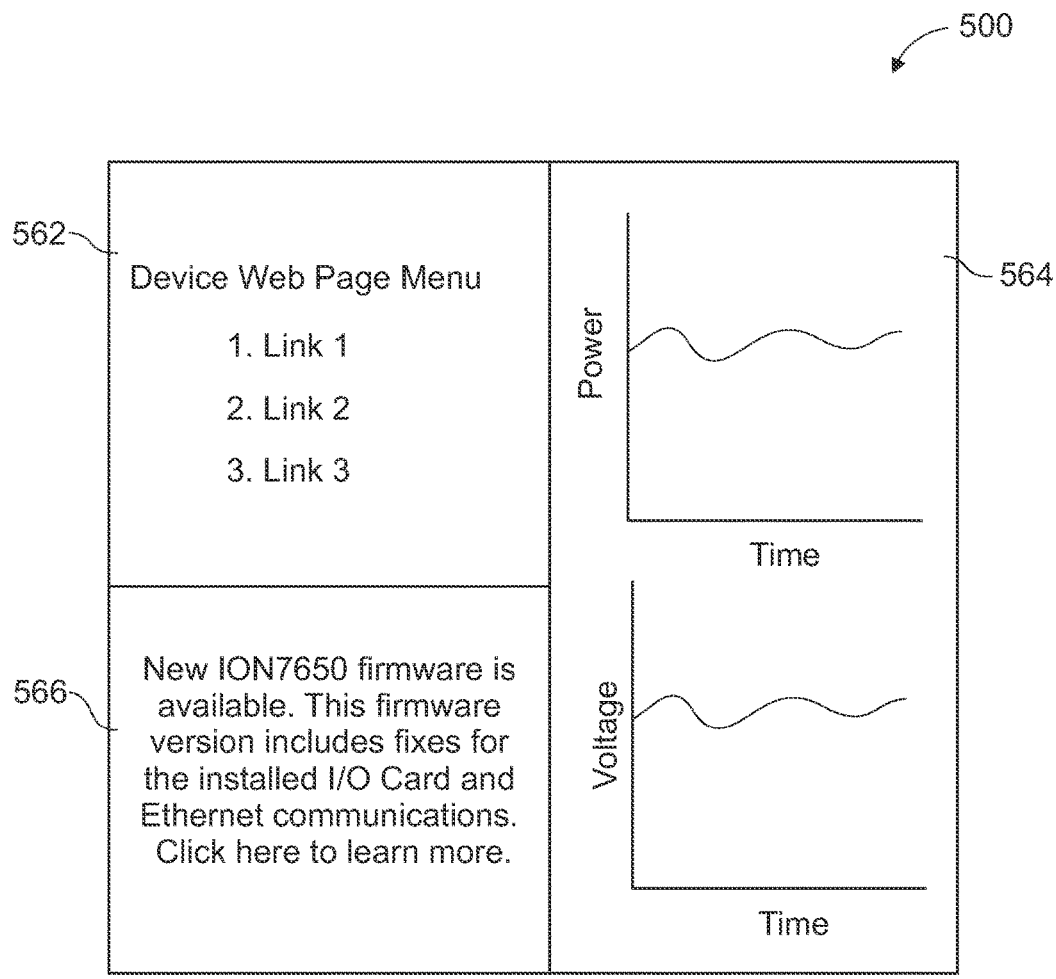
FIG. 5 illustrates an exemplary graphical interface of a browser application operating on a client computer according to the embodiment of FIG. 4.

For example, referring to FIG. 5, an exemplary browser window 500 is shown for the example of FIG. 4. The browser window includes a first frame 562, a second frame 564, and a third frame 566. While three example frames are illustrated, it will be appreciated that any other suitable number of frames can be provided. The first frame 562 displays a device web page including a menu with links for displaying information stored in the memory of the monitoring device 102. The second frame 564 displays a device web page including a graphical representation of historical data measured by a monitoring device 102 and stored in the memory of the monitoring device 102. The third frame 566 displays a web page from the remote server 112 including a notification that a new firmware update is available. The third frame 566 is able to display the notification because the device information and version information associated with the monitoring device 102 was embedded in a query string of the URL corresponding to a web page of the remote server 112, and the remote server 112 decoded the device information and version information to determine whether a newer version for that particular model of the monitoring device 102 is available. Without the device and version information provided by the monitoring device 102, the remote server 112 would be unable to determine whether a firmware/software update is available without further manual input from the user.

In the illustrated embodiment, the server URL stored in the memory of the monitoring device 102 includes the query string. However, it is contemplated that, according to some embodiments, the server URL is not stored in the memory of the monitoring device 102. Instead, the query string is formed by the monitoring device 102 after the monitoring device 102 receives a request for the device web page. Accordingly, there is no need to overwrite the URL stored in the memory of the monitoring device 102 every time the device information changes.

For example, the server URL stored in the memory of the monitoring device 102 can include merely the URL of the device manufacturer's website, e.g., "http://www.company.com." The method illustrated in FIG. 4 can, thus, further include forming a query string and incorporating the query string into the server URL stored in the memory of the monitoring device 102 or on the client computer 104. The data stored in the memory of the monitoring device 102 that is indicative of aspects of the device information is encoded according to a predefined format to form the query string. The query string can be appended to the end of the server URL stored in the memory of the monitoring device 102 and transmitted to the client computer 104.

Alternatively, instead of having the monitoring device 102 store and generate the server URL, the server URL can be generated by the client computer 104 based on data indicative of the device information transmitted by monitoring device 102 to the client computer 104. For example, the monitoring device 102 can transmit the device information to the client computer 104 in a cookie file, such as described above in connection with FIG. 2. The client computer 104 can read the device information associated with the monitoring device 102 from the cookie file and generate the query string to be appended to the manufacturer's website URL to form the server URL. The manufacturer's website URL can be stored on the monitoring device 102 or the client computer 104.

The manufacturer can, based on the device information, version information, and other information received from the monitoring devices, learn about the monitoring device installation, statistics involving environmental, use, and installation conditions, and can provide information that can help to characterize typical monitoring device installation and operating conditions.

The disclosed methods allow the device information and other information to be provided from monitoring devices on a secure private network to a manufacturer or third party vendor without compromising the security of the monitoring devices. Advantageously, there is no need to download and install specialized software on the client computer. All that is required is a simple browser software application, which is already used in utility monitoring systems to access web pages stored in monitoring devices.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the invention, which is set forth in the following claims.

What is claimed is:

1. A method for providing device information from a utility monitoring device to a server, the monitoring device being in communication with a computer over a private network, the computer further being in communication with the server over an external network, the computer including a memory, the method comprising:
    accessing, via the private network, a device web page stored on the monitoring device using a browser application operating on the computer, the monitoring device measuring a utility characteristic and storing data indicative of the utility characteristic on a memory of the monitoring device, the measured utility characteristic relating to water, air, gas, electricity, steam, or weather, wherein the private network is a secure private network and the monitoring device is isolated from the external network and the server;
    in response to the device web page being accessed, automatically receiving a file at the computer from the monitoring device via the private network, the file including the device information, the device information including at least device model information identifying a model or type of the monitoring device;
    storing the file in the memory of the computer;
    accessing, via the external network, a server web page stored on the server using the browser application operating on the computer;
    in response to the server web page being accessed, transmitting the file to the server; and
    simultaneously displaying, by the browser application operating on the computer, information from the device web page stored on the monitoring device and information from the server web page stored on the server, the information from the device web page including a graphical representation of at least a portion of the data indicative of the utility characteristic.

2. The method of claim 1, wherein the device information further includes the portion of the data indicative of the utility characteristic measured by the monitoring device.

3. The method of claim 1, wherein the device information is indicative of a version of software or firmware stored on the monitoring device.

4. The method of claim 3 further comprising:
    receiving, at the computer from the server, a software or firmware update for the monitoring device based on a comparison of the version of software or firmware provided in the device information; and
    transmitting the software or firmware update from the computer to the monitoring device.

5. The method of claim 4 further comprising modifying the file stored in the memory of the computer to indicate the software or firmware update transmitted from the computer to the monitoring device.

6. The method of claim 1 further comprising receiving, at the computer from the server, a notification or advertisement for the monitoring device based on a comparison of the device model information provided in the device information.

7. The method of claim 1, wherein the device information further includes installation information relating to the monitoring device, the installation information relating to a condition, a parameter, or a setting stored by the monitoring device, the method further comprising:
    receiving, at the computer from the server via the external network, a software or firmware update for the monitoring device based on the data indicative of the utility characteristic transmitted to the server, the software or firmware update relating to configuration parameters for the monitoring device; and
    transmitting, via the private network, the software or firmware update from the computer to the monitoring device.

8. The method of claim 1, wherein the file is a cookie file.

9. A method for providing device information from a utility monitoring device to a server, the monitoring device being in communication with a computer over a private network, the computer further being in communication with the server over an external network, the method comprising:
    accessing, via the private network, a device web page stored on the monitoring device using a browser application operating on the computer, the monitoring device measuring a utility characteristic and storing data indicative of the utility characteristic on a memory of the monitoring device, the measured utility characteristic relating to water, air, gas, electricity, steam, or weather, wherein the private network is a secure private network and the monitoring device is isolated from the external network and the server;
    in response to the device web page being accessed, automatically receiving a uniform resource locator (URL) at the computer from the monitoring device via the private network, the URL being associated with the server, the URL including a query string corresponding to the device information, the device information including at least device model information identifying the model or type of the monitoring device;
    accessing, via the external network, the server using the URL; and
    simultaneously displaying, by the browser application operating on the computer, information from the device web page stored on the monitoring device and information from a server web page stored on the server, the information from the device web page including a graphical representation of at least a portion of the data indicative of the utility characteristic.

10. The method of claim 9, wherein simultaneously displaying the information from the device web page and the information from the server web page includes displaying the information from the device web page in a first frame of the browser application and displaying the information from the server web page in a second frame of the browser application.

11. The method of claim 9 further comprising:
    forming the query string based on the device information; and incorporating the query string into the URL.

12. The method of claim 9, wherein the device information includes the portion of the data indicative of the utility characteristic measured by the monitoring device.

13. The method of claim 9, wherein the device information is indicative of a version of software or firmware stored on the monitoring device.

14. The method of claim 13 further comprising receiving, at the computer from the server, a software or firmware update for the monitoring device based on a comparison of the version of software or firmware provided in the device information; and transmitting the software or firmware update from the computer to the monitoring device.

15. A method for receiving device information from a utility monitoring device at a server, the monitoring device being in communication with a computer over a private network, the computer further being in communication with the server over an external network, the computer including a memory, the method comprising:

accessing, via the private network, a device web page stored on the monitoring device using a browser application operating on the computer, the monitoring device measuring a utility characteristic and storing data indicative of the utility characteristic on a memory of the monitoring device, the measured utility characteristic relating to water, air, gas, electricity, steam, or weather, wherein the private network is a secure private network and the monitoring device is isolated from the external network and the server;

forming the device information into a cookie file, the cookie file being transferable via the private network, and the device information including at least device model information identifying a model or type of the monitoring device, the monitoring device measuring a characteristic of a utility and storing data indicative of the characteristic in the memory of the monitoring device, the measured utility characteristic relating to water, air, gas, electricity, steam, or weather;

transmitting, via the external network, the cookie file from the computer to the server; and simultaneously displaying, by the browser application operating on the computer, information from the device web page stored on the monitoring device and information from a server web page stored on the server, the information from the device web page including a graphical representation of at least a portion of the data indicative of the utility characteristic.

16. The method of claim 15, further comprising receiving, at the computer via the private network, data indicative of the device information from the monitoring device.

17. The method of claim 15, further comprising receiving, at the computer via the private network, the cookie file from the monitoring device, the cookie file being formed by the monitoring device prior to receiving the cookie file at the computer.

18. The method of claim 15, wherein the device information is indicative of a version of software or firmware stored on the monitoring device, and the method further comprising:

receiving, at the computer from the server, a software or firmware update for the monitoring device based on a comparison of the version of software or firmware provided in the device information; and transmitting the software or firmware update from the computer to the monitoring device.

* * * * *